INVENTOR.
ROBERT C. WRIGHT
BY
Synnestvedt & Lechner
ATTORNEYS

June 7, 1966  R. C. WRIGHT  3,254,796
VENDING MACHINE

Filed Oct. 1, 1964  2 Sheets-Sheet 2

INVENTOR.
ROBERT C. WRIGHT
BY
Synnestvedt + Lechner
ATTORNEYS

United States Patent Office 3,254,796
Patented June 7, 1966

3,254,796
VENDING MACHINE
Robert C. Wright, Huntingdon Valley, Pa., assignor to Rudd-Melikian, Inc., Warminster, Pa., a corporation of Pennsylvania
Filed Oct. 1, 1964, Ser. No. 400,854
15 Claims. (Cl. 222—54)

This invention relates to a temperature control system and more particularly, to apparatus for maintaining a beverage forming fluid at a temperature very near the boiling point.

The invention is especially useful in connection with coin-operated vending machines of the type in which hot coffee, tea or other hot beverage is dispensed. One of the major problems arising with machines of this type lies in the provision of a reservoir of the hot beverage forming liquid, commonly water, which will deliver adequate quantities of hot water during peak demand periods such as coffee breaks and lunch periods. The problem is compounded by the fact that the water must be very near the boiling point to properly brew palatable beverages but must not be boiling since a boiling liquid might scald the consumer and in addition cannot be metered accurately enough to deliver uniform cupfuls to the dispensing station.

Control of the water temperature within the reservoir is a difficult proposition due to the fact that the water tends to stratify into relatively well defined temperature layers. During periods of peak demand, when a large volume of cold water is replacing the hot water withdrawn through the outlet conduit, a major portion of the liquid in the tank may be relatively cool even though the top layer is practically at the boiling point. Placing a control thermostat within the reservoir has not proved to be a satisfactory answer to the control problem, since stratification of the water invariably causes the thermostat to give a reading for only a small proportion of the total volume of water. If the thermostat is placed near the top of the reservoir where the water is hottest, the thermostat will not respond to an overall drop in temperature until the tank is largely filled with cold water. Thus, cool water may be dispensed before the heater can raise the main body of water back to a suitable temperature. On the other hand, should the thermostat be placed at a distance from the top, out of the region of the outlet conduit, it is practically impossible to control the discharge temperature of the water.

With the foregoing in mind, it is an object of the present invention to provide a control system for maintaining a beverage forming fluid at a temperature very near its boiling point even during periods of peak demand.

Another object of the invention is the provision of a control system which minimizes turbulence within the hot water reservoir thereby promoting the delivery of substantially uniform quantities of liquid to the beverage mixing station.

A further object of the invention is the provision of a temperature control system for a fluid supply reservoir which has a rapid temperature recovery rate.

A still further object of the invention is the provision of a hot water control system which embodies the features of simplicity, dependability and low cost.

How the foregoing and other objects of the invention are achieved will become more fully apparent from the following description and the accompanying drawings in which.

Figure 1:
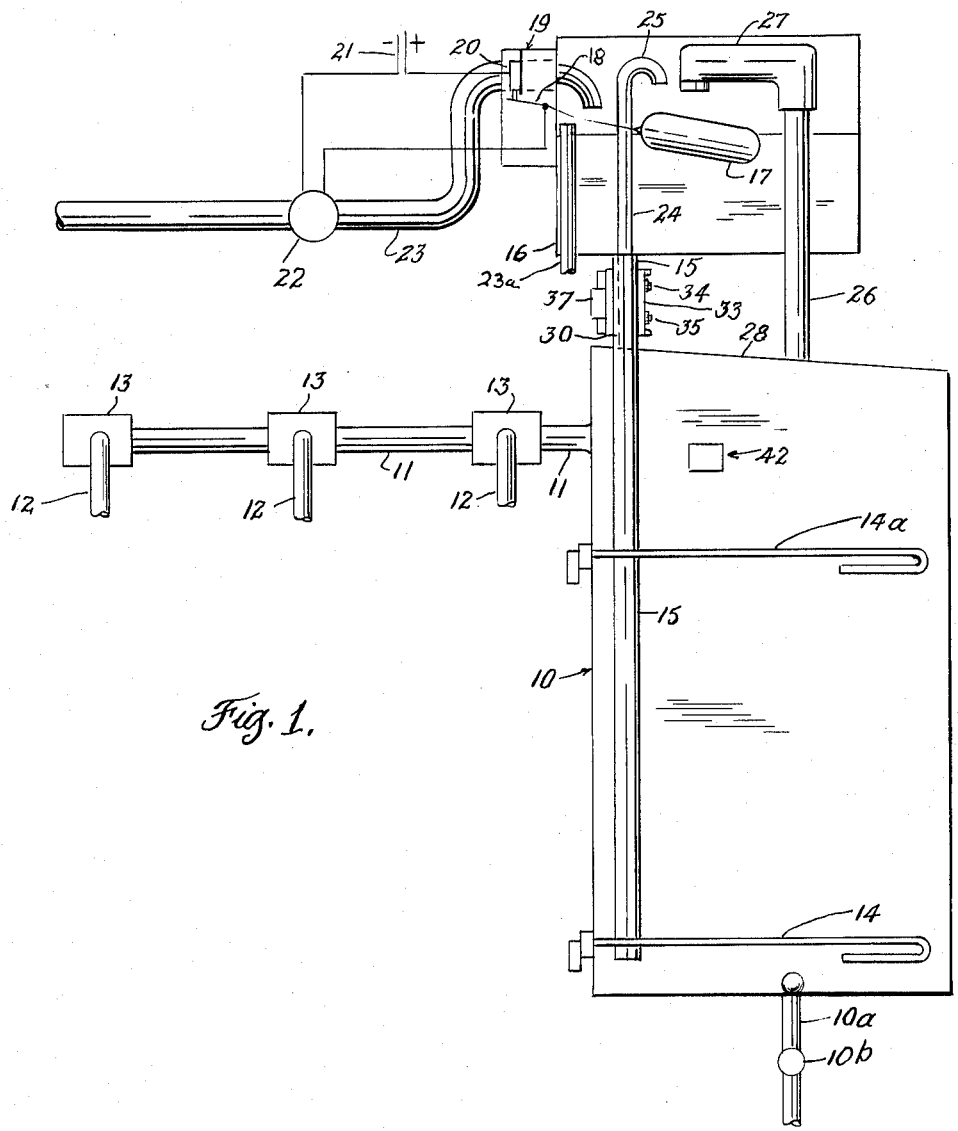
FIGURE 1 is an elevational view, partly in section, of a hot water reservoir equipped with the control system of the present invention.

As best shown in FIGURE 1, the hot water control system of the present invention is used to heat water within a chamber or reservoir 10 having an outlet conduit 11 located in the upper portion thereof. Hot water is supplied through the outlet conduit to a plurality of branch conduits 12, which lead to various beverage forming stations at which, for example, coffee, tea, hot chocolate or soup are prepared.

The branch conduits 12 are selectively connectible with supply conduit 11 by means of solenoid valves 13, by suitable control circuitry well known in the art. The reservoir 10 is filled through a conduit 15 connected to a tank 16 containing a supply of cold water. A drain line 10a having a suitable valve 10b, may be located in the bottom of the reservoir.

The supply conduit 15 preferably passes through the top of the reservoir and extends downwardly to a point just short of the reservoir bottom. The level of the water in tank 16 is controlled by a float 17 which is connected to a pivotally mounted switch arm 18 forming a part of switch 19. Switch arm 18 and a switch contact 20 are connected through a voltage source 21 to a solenoid operated valve 22 in a supply line 23 which connects the tank 16 above water level with a suitable water supply, for instance, the cold water supply line of the building in which the machine is to be placed. The float closes switch 19, opening valve 22 to fill tank 16, thereby storing a quantity of cold water which can be drawn upon to replace the hot water as it is withdrawn from tank 10 through conduit 11. As a safety precaution, an overflow line 23a, extending above the normal water level in tank 16, may also be provided. The arrangement insures that reservoir 10 will always be full.

Reservoir 10 is further provided with heating means which typically include an electrically operated immersion-type heater element 14 located in the tank bottom as shown in FIGURE 1. In cases where an unusually quick response is desired so that hot water will be available shortly after the vending machine is first turned on, a second, auxiliary heater 14a may also be provided in the upper region of the reservoir. The two heaters are controlled by the thermostatic control system of the present invention in the manner to be described more fully hereinafter. In brief, however, when the vending machine is first turned on, the control system energizes heater element 14a to supply heat to the upper portion of the liquid until this upper portion is at the desired dispensing temperature. As soon as this point is reached, heater element 14a is de-energized and thereafter the control system controls the primary heater element 14.

In order to prevent excess pressure from building up in the tank, the top of the reservoir 10 is provided with a first vent conduit 24. This conduit extends upwardly through the bottom of the cold water supply tank 16, and has a bent-over outlet 25. The tube 24 is preferably formed of a heat conductive material, for instance, copper or brass, for reasons which will be explained presently.

As can be seen in FIGURE 1, the reservoir 10 is provided with an inclined roof portion 28 and the vent conduit 24 is connected to the reservoir at the upper portion of this incline. As the water is heated, bubbles of gaseous vapors progress upwardly through the reservoir until they strike roof 28. The vapors then move upwardly along the under portion of roof 28 until they reach the conduit 24 through which they are vented to the tank 16. This arrangement prevents the formation of large vapor pockets and thus the build-up of excessive pressure within the reservoir.

An auxiliary vent conduit 26 may also be provided for the reservoir and as shown in FIGURE 1, this conduit 26 is positioned on roof 28 somewhat below conduit 24. This conduit 26 will relieve excess pressure in the reservoir if for any reason, the vapors cannot escape through conduit 24 at a sufficiently rapid rate.

Figure 2:
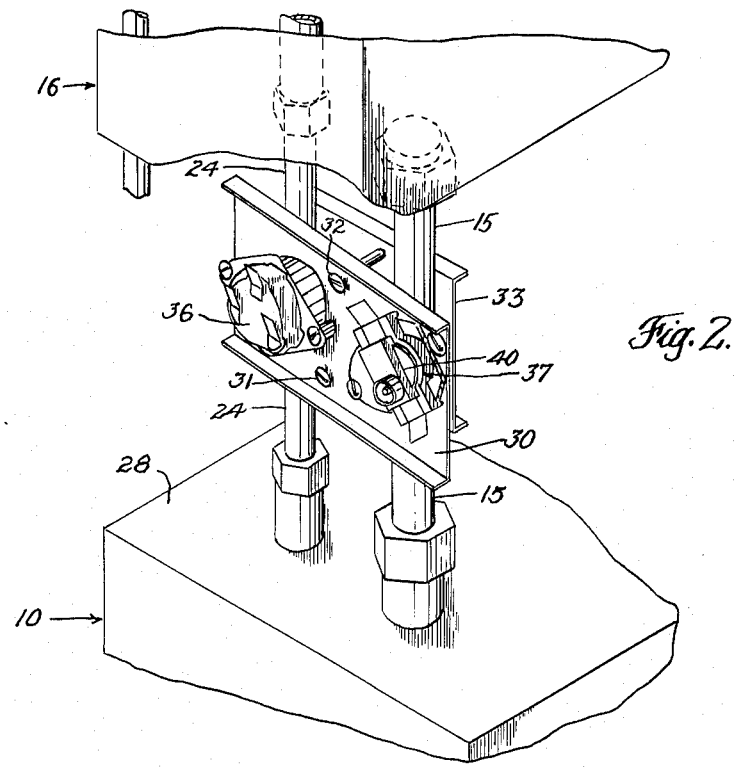
FIGURE 2 is an isometric view of a portion of the thermostatic control system shown in FIGURE 1.

Turning now to the illustrative embodiment of the control system of the present invention, FIGURE 2 shows a fragment of the top 28 of the reservoir 10 with the supply conduit 15 and the vent conduit 24 in side-by-side relationship. These two conduits are interconnected by a temperature sensitive means which, in the illustrative embodiment, is a thermally-conductive plate 30 made of copper or other suitable thermally conductive material. The plate is secured to the conduits 15 and 24 by any suitable means such as, for example, machine bolts 31 and 32 which pass through holes in a clamping plate 33, shown in FIGURES 1 and 2. The assembly is conveniently held together by lock nuts 34 and 35, threaded on the machine bolts 31 and 32. It will be seen that plate 30 will be responsive to temperature changes both in the vent 24 and in the cold water supply line 15 and provides a means through which overall temperature changes in the reservoir can be predicted and controlled. While means other than plate 30 might be employed to predict these changes, we prefer the plate in view of its simplicity and dependability.

A thermally actuated control element such as thermostat 36 is mounted on the thermally conductive plate 30 in order to sense the plate temperature. The control thermostat 36 is secured to the plate at a point in alignment with the vent conduits 24. While other types of thermostats may be employed, we prefer a snap-type disc thermostat, having a thermally-responsive disc member which is in contact with the plate 30 and which moves in response to a predetermined temperature change in the plate. By selecting a thermostat which is set to respond when the plate temperature changes by amounts which indicate overall changes in the reservoir temperature, the reservoir heating means can be controlled to supply heat and maintain an adequate supply of water at the top of the reservoir within desired brewing temperatures.

Figure 3:
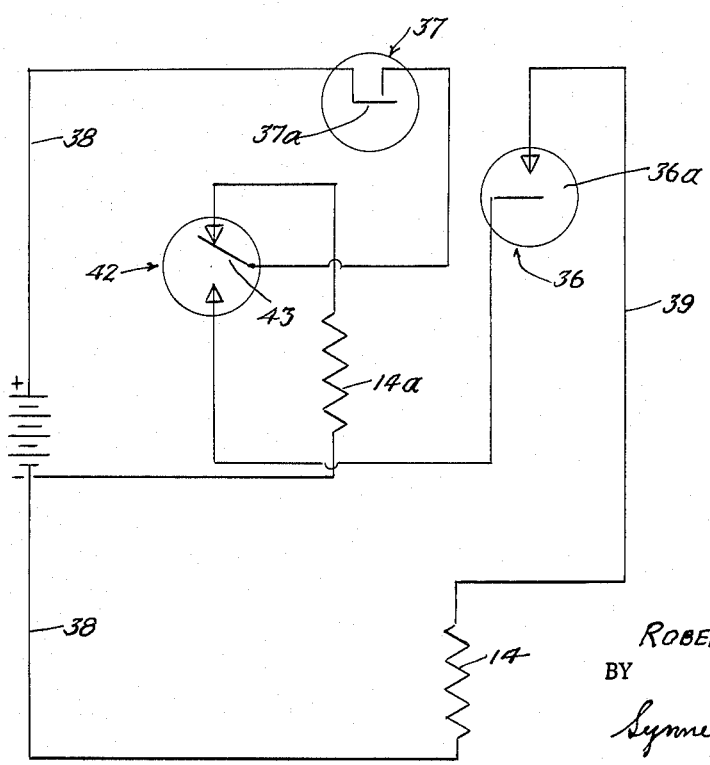
FIGURE 3 is a schematic wiring diagram used in conjunction with the control system shown in FIGURES 1 and 2.

The thermostat 36 includes a switch 36a shown diagrammatically in FIGURE 3. The switch is closed by the thermostat when the temperature of the plate 30 drops below a predetermined level and is reopened when the temperature rises to a predetermined higher level. When switch 36a closes, heater 14 is energized through the leads 38 and 39, a switch 43 and a switch 37a in a normally closed thermostat 37. The heater then delivers heat to the water in the chamber 10 until the predetermined higher temperature is reached.

The thermostat 37, similar in construction to thermostat 36, is constructed and arranged so as to open the circuit in the event that the thermostat 36 fails to operate and allows the water to overheat. This thermostat is also fixed to plate 30 but at a point aligned with the supply conduit 15. It is equipped with a push button 40 as shown in FIGURE 2 and opens a switch 37a to break the circuit to the heater 14 if the temperature in the reservoir becomes excessive and may be manually reset by depressing the push button 40.

In operation, heater 14 turns on whenever the temperature of plate 30 drops below a predetermined level, dependent upon the operating characteristics of the thermostat 36. When the plate is heated to a predetermined higher temperature level, thermostat 36 responds to open the switch 36a. Plate 30 begins to cool shortly after the heater 14 is de-energized. When hot water is drawn from the reservoir, the amount drawn off is immediately replaced by cool water from the tank 16. The flow of cool water through conduit 15 cools the conduit and also the right-hand portion of plate 30. The flow of cold water accelerates the temperature drop in the plate 30 and this temperature drop is sensed by the thermostat 36 which responds and again closes the switch 36a to again energize the heater 14.

Continued operation of the heater 14 raises the temperature of the water and the vapors in the vent pipe 24 and consequently the temperature of the plate 30 will rise. As the plate 30 reaches a second predetermined higher temperature level, thermostatic element 36 opens switch 36a to cut off the heat supply. Further withdrawal of liquid from tank 10 and replenishment through supply line 15 causes further cycling of the control system.

Should the action within the tank become violent enough that the line 24 cannot accommodate the flow of vapors, the line 26 will allow them to rapidly escape minimizing turbulence within the tank and excessive temperature variations in the line 24.

Although not essential to achieve the main objects of the invention, the heater 14a may also be included in the control system in order to bring the liquid quickly up to beverage mixing temperature. This heater is located in the upper region of tank 10 and when the temperature of the water in the supply tank is below a predetermined level, for instance, 195° F., switch arm 43 associated with thermostat 42, engages the upper switch contact to connect the heater 14a to the power supply. When the temperature reaches this pre-set level, switch arm 43 is moved to the lower position of FIGURE 3, cutting out heater 14a and connecting the control circuit for the primary heater 14 with the power supply.

After the primary heater control circuit is energized, heater 14a will no longer turn on and further heating of the water is accomplished by primary heater 14.

The temperature reflected by the plate 30 represents a composite of two temperature influences, i.e., the temperature in the vent pipe 24 and that in the cold water supply pipe 15 and permits a faster recovery than has been possible heretofore with vending machine heating systems for hot beverages. An adequate supply of hot water is available even in periods of extremely heavy demand.

The temperature can be accurately controlled at a level just below the boiling point thereby minimizing excess pressure build-up within the tank. By locating the tank 16 above the reservoir 10, the head of pressure may be held to the point necessary to keep the reservoir filled, but can be conveniently limited so that excessive pressure is not built up in the reservoir.

The sloped roof and vent conduit 24 also serve to prevent the build-up of excessive pressure in the tank. Since excess pressure causes a variation in the amount of fluid delivered through the outlet conduit 11, the system promotes uniform delivery to the beverage mixing station and thus improves the uniformity of the beverages prepared.

I claim:

1. In a machine for vending hot beverages, including a substantially enclosed chamber within which a beverage forming liquid is heated and having means for heating the liquid within the chamber, said chamber further having an outlet conduit connected thereto for delivering quantities of said heated liquid in response to varying demand;

a heat conductive supply conduit leading into the chamber for replenishing the chamber with relatively cool liquid in response to withdrawal of heated liquid through the outlet, a heat conductive vent conduit connected to the chamber near the top thereof for the escape of hot vapors, and a control system for maintaining the temperature of the fluid delivered through said outlet conduit at a substantially constant level, said control system comprising temperature sensitive means connected to said supply conduit and to said vent conduit and subject to the temperature of both and thermally activated means responsive to a predetermined temperature balance between said supply and vent temperatures to control the heating means.

2. Apparatus according to claim 1 wherein said supply conduit has a portion in closely spaced relationship with said vent conduit, and wherein said temperature sensitive means comprises a thermally conductive plate connected to said supply and vent conduits.

3. Apparatus according to claim 1, wherein said outlet conduit is connected to the chamber in the upper region thereof, said supply conduit opens into the bottom of the chamber and said heating means is associated with the lower region of the chamber; and wherein said apparatus further includes a second heating means located in the upper region of the chamber, together with a thermostat in the upper region of the chamber connected to said second heating means and responsive to temperatures below a predetermined level to cause said upper heater to operate, and, still further, wherein a switch is associated with said lower heater means and connected to said upper thermostat, said switch being operative to disconnect said lower heater from the thermally actuated means, when said thermostat causes energization of the upper heater and operative to connect the lower heater to the thermally actuated means when the thermostat de-energizes the upper heater.

4. In a machine for vending hot beverages, the combination of a hot water tank, a cold water supply tank above the hot water tank,
a valve-controlled hot water discharge pipe, a heater in the hot water tank, a cold water conduit leading from the cold water supply tank into the hot water tank,
a vent conduit extending from the top of the hot water tank and leading into the cold water tank at a point above the level of the water therein, means for maintaining a substantially constant level of water in the cold water tank, said cold water conduit and said vent conduit being heat conductive,
thermally responsive means subject to the combined influence of the temperature of the cold water conduit and the vent conduit,
and means actuated by said thermally responsive means to start the heater when the water temperature falls below a desired point and to stop the heater when the water temperature rises above a desired point.

5. In a vending machine for dispensing uniform quantities of a hot beverage, including a substantially enclosed chamber within which a beverage forming liquid is heated and maintained just below its boiling point, and having means for heating the liquid within the chamber, said chamber further having an outlet conduit connected thereto for sequentially delivering uniform quantities of the heated liquid in response to varying demand;
thermally activated means connected to said heating means for maintaining the liquid within the region of the chamber outlet conduit within predetermined temperature limits,
a cold liquid supply tank positioned above the chamber,
a supply conduit interconnecting the tank and the chamber for replenishing the chamber with relatively cool liquid in response to withdrawal of heated liquid through the outlet,
said chamber having a sloping roof portion,
a vent conduit connected to the chamber at the top of the sloping portion, said vent conduit extending upwardly into the cold liquid supply tank and having an outlet above the level of the liquid in said cold liquid supply tank.

6. Apparatus according to claim 5 wherein said chamber is provided with a second vent conduit opening into the chamber at a point below said first vent conduit.

7. Apparatus for heating a liquid within a substantially closed chamber comprising in combination;

means associated with the chamber for heating the liquid therein including an electrically controlled heater element located within the chamber;
a thermally conductive supply tube for delivering fluid into the chamber at a point adjacent the bottom thereof;
a thermally conductive vent tube communicating with the chamber of the top thereof;
control means for said heater including a thermally conductive plate connected to said supply and vent tubes,
a thermally actuated control element mounted on said plate;
a switch connected to the control element, said control element being operable to move the switch to a first position when the plate drops below a first predetermined temperature, and being operative to move the switch to a second position when the plate reaches a second predetermined higher temperature;
said switch energizing said heater when in said first position and de-energizing said heater when in said second position.

8. In a machine for vending hot beverages, including a substantially enclosed chamber within which a beverage forming liquid is heated and having means for heating the liquid within the chamber, said chamber further having an outlet conduit connected thereto for delivering uniform quantities of the heated liquid in response to varying demand;
a cold water supply tank positioned above said chamber,
a heat conductive supply conduit interconnecting said tank and the chamber,
a heat conductive vent conduit connected to the chamber near the top thereof for the escape of hot vapors, said vent conduit extending into said cold water supply tank and having its outlet slightly above the water level in said cold water tank,
a control system for maintaining the temperature of the fluid in the region of said outlet conduit at a substantially constant level, said control system comprising temperature sensitive means connected to said supply conduit and to said vent conduit,
thermally activated means interconnecting said temperature sensitive means and said heating means and responsive to a predetermined temperature balance between said supply and vent temperatures to control the heating means.

9. Apparatus according to claim 8, wherein said chamber is provided with an inclined roof portion, and said heat conductive vent conduit is connected to the chamber at the top of the incline.

10. Apparatus according to claim 9, wherein said chamber is provided with a second vent conduit and said second vent conduit opens into the chamber at a point below said heat conductive vent.

11. Apparatus according to claim 10, wherein said second vent conduit is formed of a plastic material.

12. In a machine for vending hot beverages including:
a substantially enclosed reservoir having bottom, side and roof portions, within which a beverage forming liquid is heated and maintained within a predetermined temperature range, the combination comprising:
a heat conductive vent conduit in the roof of said reservoir,
an outlet conduit communicating with the upper region of the reservoir for dispensing hot fluid therefrom;
a heater located near the bottom of the reservoir for heating the liquid therein;
a thermally responsive control element associated with said vent, and control circuitry including an energy source connecting said thermally responsive element and said heater for operating said heater, said thermally responsive element being responsive to changes in the temperature of said vent to control the delivery of heat by said heater, a second heater located within said tank, in the upper portion thereof, a second thermally responsive control element responsive to changes in the water temperature at the top of the reservoir, control circuitry including an energy source interconnecting said second thermally responsive element and the heater for operating said second heater, said second thermally responsive control element being operative to disconnect said second heater from said energy source and to connect said first heater to said energy source when the temperature of the fluid at the top of the reservoir reaches a predetermined level.

13. Apparatus according to claim 12, wherein said roof portion is inclined and said vent conduit is located at the top of the incline.

14. Apparatus according to claim 13, further including a supply conduit associated with said reservoir, said supply conduit having a portion located in side-by-side relationship with said vent conduit, said first recited thermally responsive element being located in heat transfer relation with said supply and vent conduits.

15. Apparatus for maintaining a liquid in a substantially closed chamber within a predetermined range of temperatures comprising in combination;

a heater associated with the chamber for heating the liquid therein;

an outlet conduit for drawing off heated liquid from said chamber;

a heat conductive supply conduit connected to said chamber for replenishing the liquid withdrawn through said outlet conduit;

a heat conductive vent conduit connected to the top of the chamber;

a thermally responsive control means for said heater, said control means being located in a heat transfer relationship with said supply and said vent conduits, a control circuit connecting said control means with said heater, said control means being responsive to predetermined temperature balances between said supply and said vent conduits to control the operation of the heater.

References Cited by the Examiner

UNITED STATES PATENTS

| 600,327 | 3/1898 | Winters | 222—481 X |
|---|---|---|---|
| 1,613,248 | 1/1927 | Searing | 222—67 |
| 1,996,625 | 4/1935 | Pendleton | 219—321 X |
| 2,018,538 | 10/1935 | Webb | 222—54 X |
| 2,029,460 | 2/1936 | Brady | 222—146 X |
| 2,154,021 | 4/1939 | Abbate | 219—320 X |
| 2,643,323 | 6/1953 | Carlson et al. | 219—320 X |
| 3,133,671 | 5/1964 | Christine et al. | 222—146 X |
| 3,159,190 | 12/1964 | Skiera et al. | 222—146 X |

RAPHAEL M. LUPO, *Primary Examiner.*